United States Patent
Balmakhtar et al.

(10) Patent No.: US 10,305,960 B1
(45) Date of Patent: May 28, 2019

(54) DETECTION OF ABERRANT MULTIPLEXED TRANSPORT CONNECTIONS

(71) Applicant: SPRINT COMMUNICATIONS COMPANY, L.P., Overland Park, KS (US)

(72) Inventors: Marouane Balmakhtar, Alexandria, VA (US); Rajesh Nautiyal, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 354 days.

(21) Appl. No.: 14/885,687

(22) Filed: Oct. 16, 2015

(51) Int. Cl.
*H04L 29/06* (2006.01)
*H04L 29/08* (2006.01)

(52) U.S. Cl.
CPC .............. *H04L 65/80* (2013.01); *H04L 67/02* (2013.01); *H04L 67/306* (2013.01); *H04L 67/42* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 2002/0016851 A1* | 2/2002 | Border | H04B 7/18582 709/234 |
| 2003/0072260 A1* | 4/2003 | Janoska | H04L 47/10 370/229 |
| 2009/0248917 A1* | 10/2009 | Kalos | G06F 3/061 710/39 |
| 2013/0031037 A1* | 1/2013 | Brandt | H04L 63/1408 706/12 |
| 2014/0130074 A1* | 5/2014 | Ou | H04N 21/2221 725/14 |
| 2016/0283475 A1* | 9/2016 | Panchapakesan | G06F 17/30094 |

* cited by examiner

*Primary Examiner* — Younes Naji

(57) ABSTRACT

A method includes extracting a priority indicator from network communications that corresponds to a relative priority assigned by a client to one or more logical streams for a multiplexed transport connection. A stream quantity indicator is identified from network communications that corresponds to a number of logical streams initiated by the client for the multiplexed transport connection. The multiplexed transport connection is mapped to a connection profile based on one or more connection attributes of the multiplexed transport connection. Using the connection profile, a deviation of the multiplexed transport connection from a benchmark of the connection profile for the priority indicator and the stream quantity indicator is identified. A network access service of the client is altered based on the identifying of the deviation of the multiplexed transport connection.

20 Claims, 5 Drawing Sheets

| DEVICE | OS | APPLICATION | RESOURCE TYPE | PRIORITY REFERNCE | STREAM QUANTITY REFERNCE |
|---|---|---|---|---|---|
| Smart Phone | Win | Firefox | JSS | 5 | 12 |
| Tablet | iOS | YouTube | CSS | 3 | 15 |
| PC | MAC | Chrome | HTML | 2 | 34 |

FIG. 2

DETECTION OF ABERRANT MULTIPLEXED TRANSPORT CONNECTIONS

SUMMARY

The present disclosure is directed, in part, to the detection of aberrant multiplexed transport connections, substantially as shown in and/or described in connection with at least one of the figures, and as set forth more completely in the claims.

In certain respects, network communications corresponding to multiplexed transport connections are monitored. Each multiplexed transport connection supports a plurality of concurrent logical streams. Priorities assigned by clients to logical streams for the multiplexed transport connections as well as quantities of client initiated logical streams for the multiplexed transport connection are detected in the network communications and are utilized to identify aberrant multiplexed transport connections and/or rogue clients or users. By using the priorities assigned to logical streams and quantities of client initiated loggia streams, aberrant multiplexed transport connections and/or rogue clients or users can be identified even where the multiplexed transport connections comprise encrypted logical streams.

In further respects, connection profiles are provided, which each comprise a benchmark for priority indicators and stream quantity indicators that are respectively based on the priorities assigned by clients to logical streams for the multiplexed transport connections and quantities of client initiated logical streams for the multiplexed transport connection. Connection attributes of multiplexed transport connections are used to map the connections to a connection profile and the benchmark of the connection profile is used to detect deviations from the benchmark. Aberrant multiplexed transport connections and/or rogue clients or users can be identified based on the deviations.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 2 illustrates exemplary connection profiles in accordance with implementations of the present disclosure;

DETAILED DESCRIPTION

Figure 1:
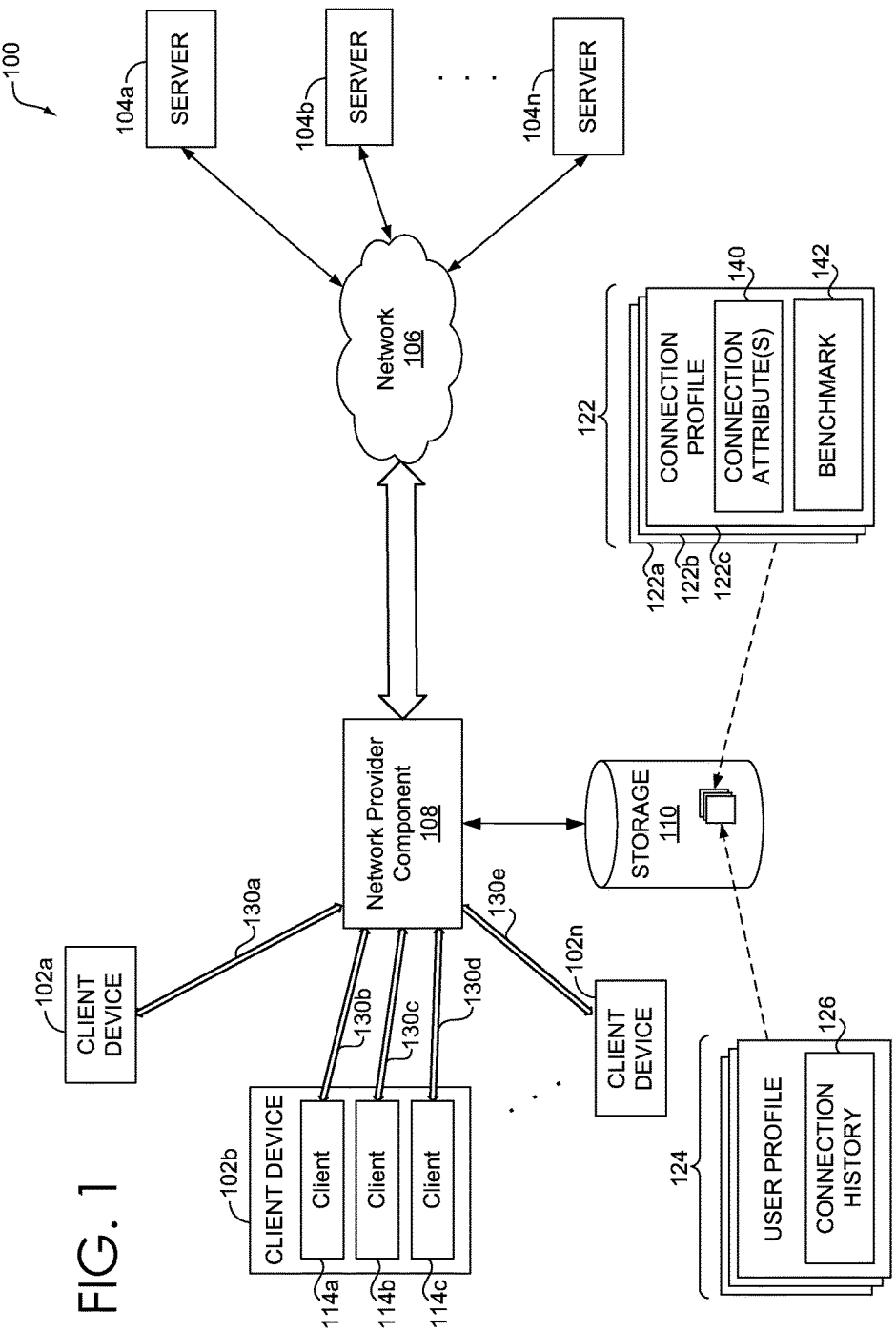
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
4G Fourth-Generation Wireless Telephone Technology
CDMA Code Division Multiple Access
WCDMA Wideband Code Division Multiple Access
HSDPA High-Speed Downlink Packet Access
CD-ROM Compact Disk Read Only Memory
EEPROM Electrically Erasable Programmable Read Only Memory
ENODEB Evolved Node B
GPS Global Positioning System
GSM Global System for Mobile Communications
LTE Long Term Evolution
PC Personal Computer
PDA Personal Digital Assistant
RAM Random Access Memory
RF Radio Frequency
ROM Read Only Memory
TDMA Time Division Multiple Access
UMTS Universal Mobile Telecommunications Systems
Wi-Fi Wireless Fidelity
WiMAX Worldwide Interoperability for Microwave Access
HTML Hypertext Markup Language
CSS Cascading Style Sheet
JSS JavaScript Style Sheet
HTTP Hypertext. Transfer Protocol Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 1, a diagram is depicted of an exemplary network environment in which implementations of the present disclosure may be employed. In particular, the exemplary computer environment is shown and designated generally as network environment 100. Network environment 100 is but one example of a suitable computing environment and is not intended to suggest any limitation as to the scope of use or functionality of the invention. Neither should network environment 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Network environment 100 includes client devices 102a and 102b through 102n (also referred to as "client devices 102"), servers 104a and 104b through 104n (also referred to as "servers 104"), network 106, network provider component 108, and storage 110.

In network environment 100, a client device, such as any of client devices 102 may take on a variety of forms, such as a personal computer (PC), a user device, a smart phone, a smart watch, a laptop computer, a mobile phone, a mobile device, a tablet computer, a wearable computer, a smart appliance, a personal digital assistant (PDA), a server, a CD player, an MP3 player, a global positioning system (GPS) device, a video player, a handheld communications device, a workstation, a router, an access point, and any combination of these delineated devices.

Figure 6:
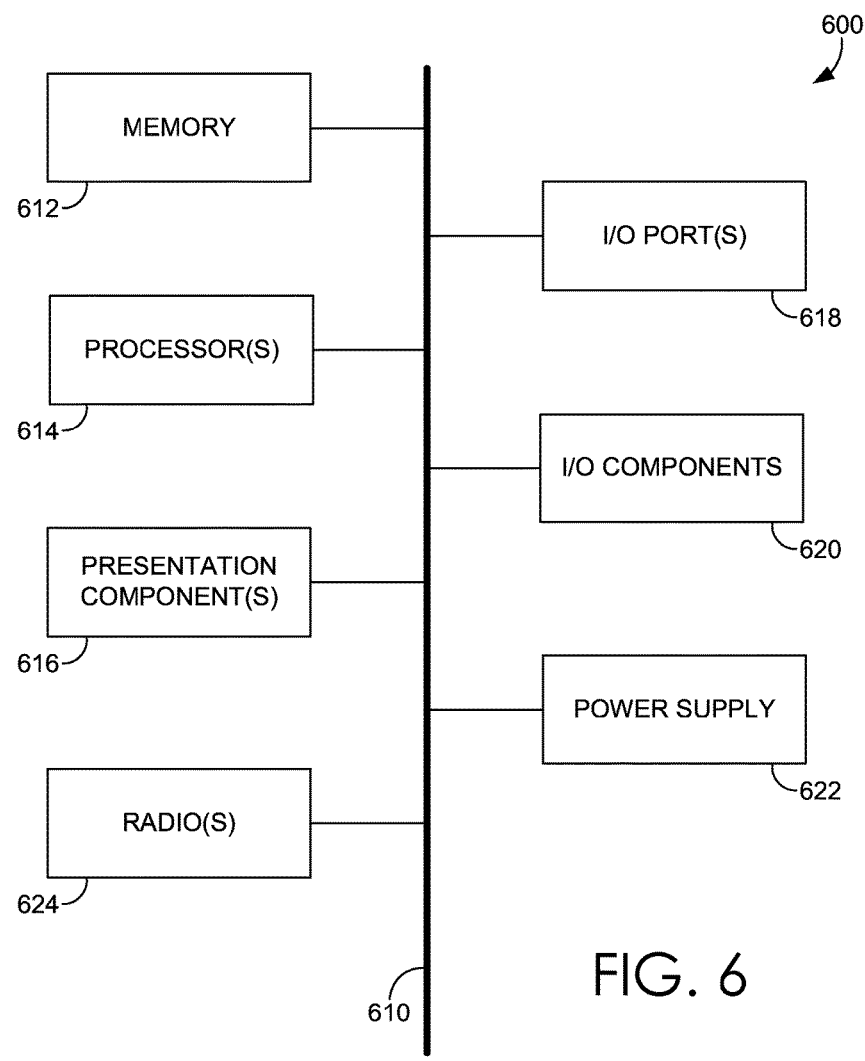
FIG. 6 depicts a diagram of an exemplary computing environment suitable for use in implementations of the present disclosure.

In some respects, the client device can correspond to computing device 600 in FIG. 6. Thus, a client device can include, for example, a display(s), a power source(s) (e.g., a battery), a data store(s), a speaker(s), memory, a buffer(s), a radio(s) and the like. In some implementations, the client device comprises a wireless or mobile device which can use a wireless network(s) for communication (e.g., voice and/or data communication). In this regard, the client device can be any mobile computing device that communicates by way of a wireless network, for example, a wireless telecommunications network, such as a 3G and/or 4G network. More generally, the client device may be any device capable of communicating with one or more of servers 104 over network 106.

Network 106 can include multiple networks, as well as being a network of networks, but is shown in more simple form so as to not obscure other aspects of the present disclosure. Further, in some implementations, client devices 102 and servers 104 may be on the same network. Networks 106 can comprise a local-area network (LAN), such as a company Intranet, a metropolitan area network (MAN), and/or a wide area network (WAN), such as the Internet or the World Wide Web.

Network provider component 108 is configured to provide client devices 102 with access to network 106 by way of a network access service. As used herein, a network access service generally refers to access provided by a network provider component to a client device. Network provider component 108 comprises one or more devices that facilitate network communications between client devices 102 and servers 104. In this respect, network provider component 108 comprises one or more intermediary devices capable of intercepting network communications from client devices 102 to servers 104.

In some implementations, network provider component 108 is part of a service provider network, such as an internet service provider, and network 106 comprises one or more backbone networks of the internet. Furthermore, network provider component 108 can optionally include an array of devices or components (e.g., one or more base stations). Components such as terminals, links, and nodes (as well as other components) can provide connectivity in various implementations. In some instances, network provider component 108 is associated with a network of a telecommunications provider that provides services (e.g., over LTE) to client devices, such as client devices 102. For example, the network may provide voice services to client devices or corresponding users that are registered or subscribed to utilize the services provided by the telecommunications provider. The network can comprise any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

Each of servers 104 are configured to communicate with client devices 102 over network 106. Servers 104 may comprise file servers, application servers, web servers, proxy servers, and/or gateway servers. In some implementations, servers 104 are configured to respond to requests from client devices 102. As an example, client devices 102 and servers 104 may communicate using a request-response protocol, such as HTTP. The requests and responses can be utilized to facilitate the transfer of data, such as files, web sites, applications, APIs and more from servers 104 to client devices 102.

Communications between client devices 102 and servers 104 can be facilitated on client devices 102 using one or more clients, such as clients 114a, 114b, and 114c (also referred to as "clients 114"), shown on client device 102b. Each of clients 114 can comprise an application or service. As one specific example, client 114a could be a web browser, client 114b could be a video streaming application, and client 114c could be an operating system service.

Clients 114 are configured to communicate with servers 104 using logical streams. As used herein, a logical stream can refer to a bi-directional flow of bytes across a virtual channel between a client and a server. In various implementations, multiple logical streams can be concurrently established between a client and a server over a single connection. In particular, logical streams can be multiplexed and transmitted over a multiplexed transport connection. The multiplexed transport connection can utilize a transport protocol, such as TCP. In some implementations, a client can be any application or service capable of communicating with a server using one or more multiplexed transport connections. For example, FIG. 1 shows multiplexed transport connections 130a, 130b, 130c, 130d, and 130e (also referred to as connections 130).

Each logical stream may multiplex an HTTP transaction into a TCP connection, which may be accomplished using a TLS connection. This may be accomplished utilizing a protocol that supports multiplexed transport connections, such as SPDY or HTTP 2.0 and beyond. However, the present disclosure is not limited to a particular protocol. HTTP version 1.1 is a synchronous protocol, enabling only one request to be carried on a given HTTP connection. It is also request driven, so that a server can only send data that was requested.

The SPDY protocol is designed to enhance HTTP to overcome some of the early limitations of HTTP. Generally, the SPDY protocol adds a session layer on top of a presentation layer (e.g., SSL) that allows for multiple concurrent, interleaved or multiplexed logical streams over a single transport protocol TCP connection. As multiple requests can be interleaved on a single channel, the efficiency of the underlying TCP is much higher than with discrete channels.

SPDY also implements request priorities where the client can request as many streams as it wants from the server, and assign a priority to each stream. This feature is intended to prevent the network channel from being congested with non-critical resources when a high priority request is pending. SPDY also provides for compression of request and response HTTP headers, which results in fewer packets and fewer bytes transmitted. Due to the advantages of SPDY, it has become widely adopted on the internet. Furthermore, various concepts of SPDY have been or are being incorporated into other protocols. For example, HTTP 2.0 is likely to adopt many of the features and conventions of SPDY.

At the same time multiplexed transport connections, such as those that employ SPDY, are becoming ubiquitous, so are encrypted communications between clients and servers. For example, TLS encryption is used in most SPDY implementations. While encrypting communications is highly desirable for data security, third parties to the communications often utilized this information for benign or beneficial purposes. For example, network service providers, such as ISPs often used unencrypted information to properly control traffic in their networks. As an example, it may be desirable for network provider component 108 to detect rouge clients causing aberrant communications, which may be intended to compromise network environment 100, such as by way of a denial of service attack.

It has been found that malicious behavior by clients is often correlated with the priority assigned by clients to logical streams for a multiplexed transport connection combined with the number of logical streams initiated by the client for the multiplexed transport connection. In particular, aberrations from typical connections for these features indicate that a client may be a rogue client.

In accordance with implementations of the present disclosure, a connection profile is utilized to determine whether one or more multiplexed transport communications are aberrant connections. The connection profile includes a benchmark, or standard, deviation from which is indicative of aberrant connections. The benchmark is for a priority indicator corresponding at least one multiplexed transport connection and a stream quantity indicator corresponding to at least one multiplexed transport connection. In particular, the priority indicator and the stream quantity indicator are applied to the benchmark to identify at least one aberrant connection.

A priority indicator can correspond to a relative priority assigned by a client to one or more logical streams for a multiplexed transport connection. For example, for a multiplexed transport connection based on SPDY, the relative priority may be assigned by the client to a stream. In SPDY, this priority can be assigned using an integer value between 0 and 7 with 0 being the highest priority and 7 being the lowest priority. The priority may be included in a SYN_STREAM frame sent by the client to a server. The network communication may be sent to network provider component 108, which extracts the priority therefrom and optionally also sends the network communication to the server. One of more of such priority data from one or more network communications can be utilized to generate the priority indicator applied to a benchmark.

A stream quantity indicator can correspond to a number of logical streams initiated by a client for a multiplexed transport connection. For example, for a multiplexed transport connection based on SPDY, a client can initiate a logical stream by sending a control frame. Network provider component 108 can generate the stream quantity indicator from one or more control frames or other network communications that indicate an initiation of a logical stream. In some cases, the stream quantity is based on a number of concurrent logical streams initiated by the client for a multiplexed transport connection. However, the stream quantity could in addition or instead be based on a frequency that the client initiates the streams.

In some implementations, by applying the stream quantity indicator and the priority indicator to the benchmark, network provider component 108 can identify aberrant connections regardless of whether the connections are encrypted. As indicated above, this information can be identified from a multiplexed transport connection, even where the network communications of the connection remain encrypted. Thus, network provider component 108 can detect and manage rogue clients at least by using the benchmark for the priority indicator and the stream quantity indicator.

In accordance with implementations of the present disclosure, any number of connection profiles, such as connection profiles 122*a*, 122*b*, and 122*c* (also referred to as connection profiles 122) are employed by network provider component 108 to assist in detecting aberrant connections with respect to clients. Connection profiles 122 each correspond to one or more connection attributes (e.g., connection attributes 140) and comprise the benchmark (e.g., benchmark 142) corresponds to priorities of logical streams and stream quantities.

FIG. 2 illustrates exemplary connection profiles 222 in accordance with implementations of the present disclosure. Connection profiles 222 represent one example of connection profiles 122 of FIG. 1, where connection profiles 222*a*, 222*b*, and 222*c* can correspond respectively to connection profiles 122*a*, 122*b*, and 122*c* of FIG. 1. Connection profiles 222 include connection attributes 240 and benchmarks 242.

Each connection profile can have its benchmark defined to indicate what typical and/or acceptable behavior is for one or more multiplexed network connections, such that atypical connections can be identified based on deviating from the benchmark. In some cases, this standard of behavior is associated with one or more connection attributes of connections. In particular, some types of connections may typically behave differently than others depending on various characteristics of the connection. Connection attributes 240 capture sets of these characteristics such that the appropriate benchmark can be applied to one or more particular multiplexed transport connections.

As shown, each connection profile comprises a respective set of connection attributes, which network provider component 108 can utilize to map at least one multiplexed transport connection to the connection profile. Having mapped the at least one multiplexed transport connection, its corresponding priority indicator and stream quantity indicator can be applied to the benchmark of the connection profile to determine whether the connection is an aberrant connection.

As shown, one example of a connection attribute is a device or platform type that hosts the client participating in the multiplexed transport connection. Examples shown include Smart Phones, Tablets, and PCs, however other device types can be considered including those discussed above with respect to client devices 102. While the device type attribute is at a relatively broad level of categorization in FIG. 2, they could be made narrower.

A further example includes an operating system that hosts the client participating in the multiplexed transport connection. Examples shown in FIG. 2 include Windows, Macintosh, and iOS. While the operating system attribute is at a relatively broad level of categorization in FIG. 2, it could be made narrower using version information, or the version information could be a separate attribute.

Another example shown is an application type of the client. Examples shown in FIG. 2 include Firefox, YouTube, and Chrome. The application type may be at a broader or narrower level of categorization. For example, application types could include web browser and non-web browser, or could other information. Further, application version information could be used as an attribute.

Yet a further example shown is a resource type of the multiplexed transport connection that corresponds to a type of resource to be transferred or being transferred over the multiplexed transport connection. Examples shown in FIG. 2 include HTML, JSS, and CSS. The application type may be at a broader or narrower level of categorization.

Network provider component 108 can determine the connection attributes of the multiplexed transport connections from the multiplexed transport connections or other information known or associated with the multiplexed transport connections. At least some of the connection attributes may be determined by analyzing one or more network communications associated with the client and/or a client device that hosts the client. For example, some information may be extracted from the multiplexed transport connection to be mapped to a connection profile.

In addition, or instead, one or more connection attributes may be extracted from other network communications. As an example, while multiplexed transport connection may at times not include information such as the operating system or device type, other connections may have included this information. Historical connection attribute information may be stored in storage 110 and applied to the mapping of the multiplexed transport connection. Connection attribute information may be extracted from one or more handshake communications, such as between the client and one of servers 104 and/or network provider component 108. Often a user agent will identify at least some connection attributes in a header field of a network communication.

Network provider component 108 may utilize the benchmark of the connection profile corresponding to a multiplexed transport connection to determine whether the multiplexed transport connection is an aberrant connection. In the example shown, each of benchmarks 242 incorporates a priority standard or threshold and a stream quantity standard or threshold. An aberrant connection(s) may be identified based on comparing the priority indicator with the priority threshold and the stream quantity indicator to the stream quantity threshold.

As one specific example, network provider component 108 may identify a multiplexed transport connection as an aberrant connection based on the priority indicator exceeding the priority threshold and the stream quantity indicator exceeding the stream quantity threshold. For example, assume that a multiplexed transport connection has a priority indicator between 0-4, where a lower integer value indicates a higher priority for a multiplexed transport connection. Further assume that the multiplexed transport connection has a stream quantity of 80. Network provider component 108 may determine that such a connection is an aberrant connection based on the benchmark corresponding to connection profile 222*a*.

It should be appreciated that the foregoing is but one example of how a benchmark may be implemented. However, the benchmark could employ a combined priority and stream quantity standard or threshold, and need not be represented using any thresholds. In some cases, the benchmark comprises a function that receives the priority indicator and the stream quantity indicator, either by way of separate variables or a single variable. The output of the function could be indicative of the amount of deviation from the benchmark. Deviation from the benchmark may be determined, for example, where the output exceeds a threshold value. As another example, separate functions could be used for priority and stream quantity.

It is also noted that the priority indicator and the stream quantity indicator need not be the only factors employed by network provider component 108 in identifying aberrant connections and/or rogue clients. In some implementations, another such factor is a duration of deviation from the benchmark. For example, in some cases, the priority indicator and stream quantity indicator are not static, but are periodically determined by network provider component 108. Thus, network provider component 108 can identify aberrant connection(s) that may have initially conformed to a benchmark. Network provider component 108 may determine that a client is a rogue client and/or one or more connections are aberrant based on deviation being detected (or exceeding a threshold) for the client for at least a predetermined duration (e.g., 5 minutes). By doing so, some deviation may be permitted so long as it does not occur for an extended duration.

It is noted that as with priorities and stream quantities, duration need not be implemented as a factor using a threshold. For example, detection of an aberrant connection(s) could be implemented as a function of duration, priority and stream quantity. It is further noted that conditions under which network provider component 108 tracks the duration can vary as needed. In some cases, the duration could reset where the deviation becomes sufficiently low or the connection(s) is no longer deviating. In other cases, any deviation that occurs within a rolling window may be counted toward the duration. These and other variations are possible.

The connection profile(s) employed by network provider component 108 can be manually coded and/or machine generated. For example, an administrator may preconfigure as least some benchmarks and/or connection attributes. In some case, at least some of these feature and/or the connection profiles themselves can be automatically generated and/or updated by network provider component 108. For example, network provider component 108 can configure each of connection profiles 122 based on an analysis of one or more network communications from one or more client devices (e.g., client devices 102). In doing so, network provider component 108 can learn typical behavior of clients (e.g., values of priorities and stream quantities) so as to establish the benchmarks (e.g., benchmarks 242) based on data extracted from the network communications. The network communications could be multiplexed transport connections. However, as least some may not be multiplexed transport connections.

Network provider component 108 may identify network communications of clients based on the network communications corresponding to the one or more connection attributes. Network provider component 108 may further generate a benchmark for a connection profile that corresponds to the one or more connection attributes from the identified network communications. A machine learning algorithm may be employed for generating benchmarks. The machine learning algorithm could utilize the one or more connection attributes as a predictor of the benchmark. A prediction from the machine learning algorithm could be utilized to identify deviations of multiplexed transport connections. The benchmarks could be updated periodically or continuously, or remain constant (e.g., after a training period).

While it has been described that the benchmarks of connection profiles could be machine learned, the connection profiles themselves could be machine learned. For example, by analyzing network traffic, network provider component 108 could identify statistically significant sets of connection attributes and construct profiles for at least some of those sets of connection attributes. Further, benchmarks could be generated as part of the determination. For example, sets of connection attributes with statistically similar benchmarks may not be provided with separate connection profiles.

Having identified a deviation of a multiplexed transport connection(s) from a benchmark of a connection profile, network provider component 108 may take various courses of action. In some cases, network provider component 108 maintains user profiles, such as user profiles 124 (e.g., in storage 110) based on the identified deviations. The user profiles can include connection histories (e.g., connection history 126) of clients and/or users. The connection histories can be employed to determine whether to take action and/or a course of action to take based on identifies deviation(s). For example, network provider component 108 may classify certain users as rogue users based on identified deviations.

Network provider component 108 can take any of a variety of potential actions in based on identifying one or more aberrant connections. In some implementations, at least one multiplexed transport connection associated with a user or client device that corresponds to an aberrant multiplexed transport connection may be blocked or redirected. For example, the aberrant multiplexed transport connection and or other multiplexed transport connections associated with the user may be blocked or redirected (e.g., to a predetermined portal). In addition, or instead, a notification may be sent to the user and/or client device. The notification may indicate the identification of the aberration in network behavior. Notifications may be provided using texts, emails, and/or push notifications.

In these and potentially other ways, network provider component 108 alter the network access service of the client based on the identifying deviations of multiplexed transport connections. In doing so, network provider component 108 improve the battery life of client devices 102 by reducing the power consumption caused by rogue clients. Further, the quality of service of the network is improved of the users of the network. Additionally, servers 104 can be protected from excessive requests, such as in denial of service attacks.

It is noted that the foregoing has been described with respect to network provider component 108; however, the identification of deviations may generally be performed by any device and/or system capable of analyzing the pertinent information on multiplexed transport connections. As one example, one of servers 104 could implement similar functionality as network provider component 108. A server may use the aforementioned factors in addition to or instead of other factors in order to identify aberrant connections. As a further example, client device 102 may implement similar functionality as network provider component 108. For example, a service running on a client device may monitor multiplexed transport connections of one or more clients on the client device. Server, client devices, and/or other devices that implement this aberration detection may take similar actions as described with respect to network provider component 108, such as by altering a network access service.

It will further be appreciated that while approaches described herein can be accomplished where the logical streams of a multiplexed transport connection are encrypted, they may also be implemented on where the logical streams are unencrypted. Further, the approaches may supplement other approaches to detecting aberrant connections, clients, and/or users, some of which may include decrypting one or more of the logical streams.

Figures 3, 4:
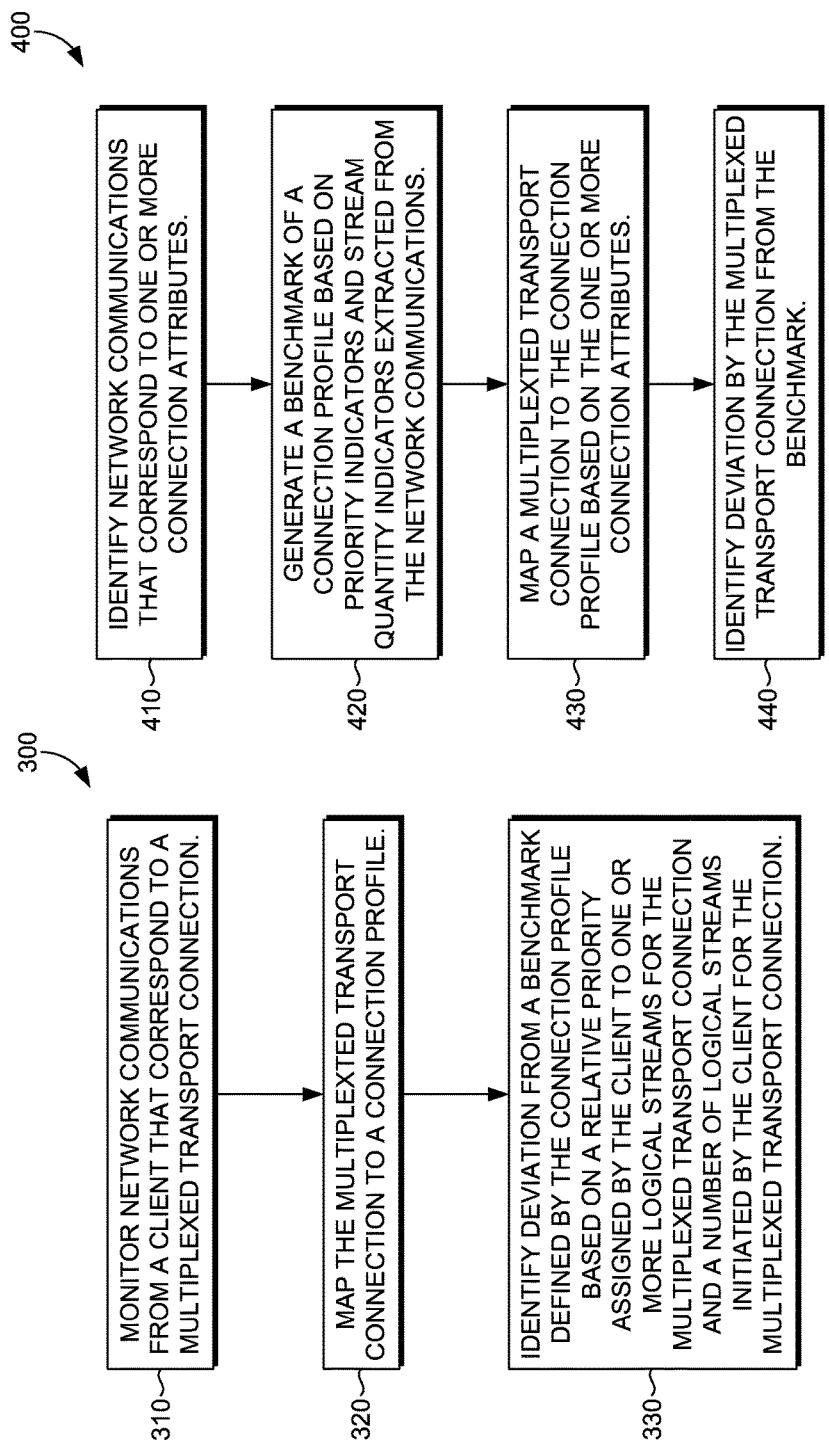
FIG. 3 depicts a flow diagram of an exemplary method for detecting aberrant multiplexed transport connections in accordance with implementations of the present disclosure.
FIG. 4 depicts a flow diagram of an exemplary method for detecting aberrant multiplexed transport connections in accordance with implementations of the present disclosure.

Referring now to FIG. 3, FIG. 3 depicts a flow diagram of an exemplary method 300 for detecting aberrant multiplexed transport connections in accordance with implementations of the present disclosure. Method 300 is described below with respect to network environment 100, for illustrative purposes only. However, method 300 is not limited to particular features of network environment 100 described herein. Furthermore, what is shown in FIG. 3 should not necessarily be considered comprehensive with respect to method 300 in that certain procedures may be omitted or additional procedures may be employed. Also, certain orderings of those procedures indicated by FIG. 3 should not be considered limiting and may be altered in certain implementations of the present disclosure.

At block 310, method 300 includes monitoring network communications from a client that correspond to a multiplexed transport connection. For example, network provider component 108 may monitor network communications of multiplexed transport connection 130*b* from client 114*a*.

At block 320, method 300 includes mapping the multiplexed transport connection to a connection profile. For example, network provider component 108 may map multiplexed transport connection 130*b* to connection profile 222*a*. To do so, network provider component 108 may identify one or more connection attributes of multiplexed transport connection 130*b* and select the connection profile that matches the connection attributes. At least some of the one or more connection attributes could be extracted from network communications corresponding to multiplexed transport connection 130*b*.

At block 330, method 300 includes identifying a deviation from a benchmark defined by the connection profile based on a relative priority assigned by the client to one or more logical streams for the multiplexed transport connection and a number of logical streams initiated by the client for the multiplexed transport connection. For example, network provider component 108 may identify a deviation from the benchmark corresponding to the priority reference and stream quantity reference shown of connection profile 222*a* based on a priority indicator and a stream quantity indicator extracted from the multiplexed transport connection. Based on the identifying the deviation, network provider component 108 may alter a network access service of the client, client device, and/or user associated with the multiplexed transport connection.

Referring now to FIG. 4, FIG. 4 depicts a flow diagram of an exemplary method 400 for detecting aberrant multiplexed transport connections in accordance with implementations of the present disclosure. At block 410, method 400 includes identifying network communications that correspond to one or more connection attributes. For example, network provider component 108 may identify network communications of multiplexed transport connections 130*a* and 130*e*. The network communications may correspond to the connection attributes of connection profile 222*b*.

At block 420, method 400 includes generating a benchmark of a connection profile based on priority indicators and stream quantity indicators extracted from the network communications. For example, network provider component 108 may generate the priority reference and stream quantity reference corresponding to connection profile 222*b* based on an analysis of the network communications. This could include extracting relative priorities assigned by clients to logical streams from the network communications and/or determining numbers of streams initiated by clients using the network communications. Further, this information may be applied to a machine learning algorithm to determine the reference data used in the benchmark. Generating the benchmark may create the benchmark or update the benchmark. Further the benchmark may already be part of connection profile 222*b* or may be used in a newly constructed connection profile 222*b*.

At block 430, method 400 includes mapping a multiplexed transport connection to the connection profile based on the one or more connection attributes. For example, network provider component 108 may map multiplexed transport connection 130*c* to connection profile 222*b*.

At block 440, method 400 includes identifying a deviation by the multiplexed transport connection from the benchmark. For example, network provider component 108 may identify that multiplexed transport connection 130*c* deviated from the benchmark of connection profile 222*b*. Based on the identifying, network provider component 108 can take any of a variety of potential actions.

Figure 5:
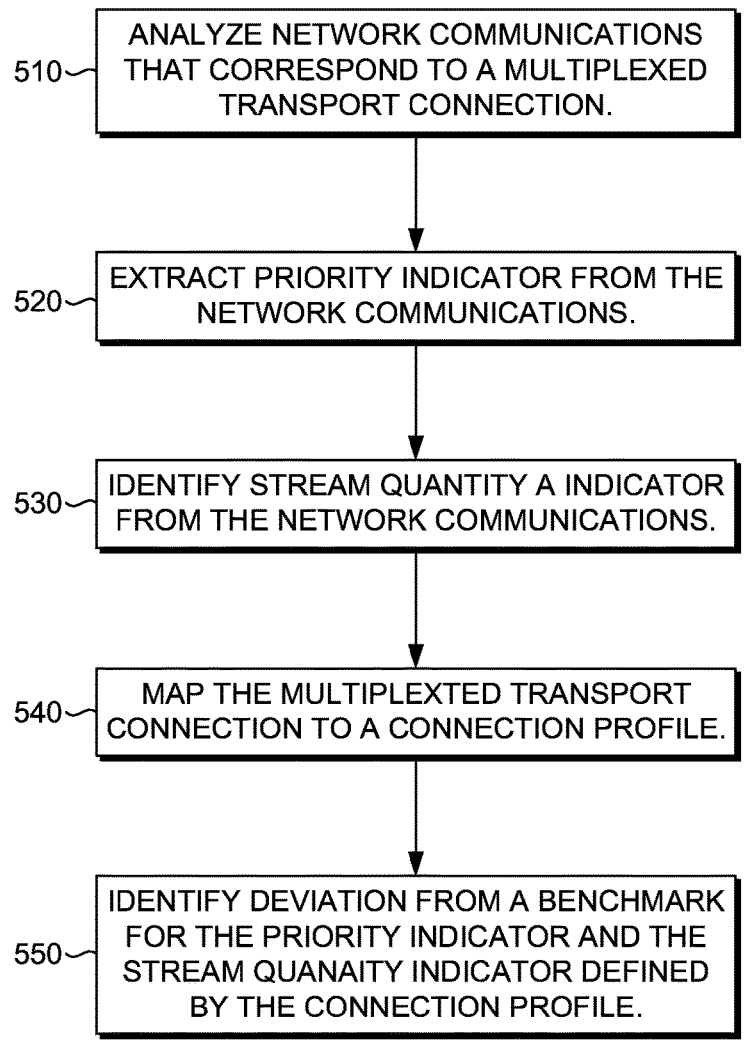
FIG. 5 depicts a flow diagram of an exemplary method for detecting aberrant multiplexed transport connections in accordance with implementations of the present disclosure.

Referring now to FIG. 5, FIG. 5 depicts a flow diagram of an exemplary method 500 for detecting aberrant multiplexed transport connections in accordance with implementations of the present disclosure. At block 510, method 500 includes analyzing network communications that correspond to a multiplexed transport connection. For example, network provider component 108 may analyze network communications of multiplexed transport connection 130*d*.

At block 520, method 500 includes extracting a priority indicator from the network communications. For example, network provider component 108 may extract the priority indicator from one or more SYN_STREAM frames or other portions of multiplexed transport connection 130*d*.

At block 530, method 500 includes identifying a stream quantity indicator from the network communications. For example, network provider component 108 may count the number of logical streams indicated by client 114*a* for multiplexed transport connection 130*d*. This may be accomplished by analyzing control frame for multiplexed transport connection 130*d*. In some cases, the stream quantity indicator is discounted by closed logical streams detected by network provider component 108, such as by subtracting closed streams from the count.

At block 540, method 500 includes mapping the multiplexed transport connection to a connection profile. For example, network provider component 108 may map multiplexed transport connection 130*c* to connection profile 222*c* based on one or more connection attributes of multiplexed transport connection 130*c*.

At block 550, method 500 includes identifying a deviation from a benchmark for the priority indicator and the stream quantity indicator defied by the connection profile. For example, network provider component 108 may identify that the priority indicator and the stream quantity indicator deviate from the priority reference and the stream quantity reference of connection profile 222*c*. Based on the identifying, network provider component 108 can take any of a variety of potential actions.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, implementations of the present disclosure provide for detecting aberrant multiplexed transport connections. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer-implemented system for detecting aberrant network communications in a plurality of network communications, the system comprising:
   a processor and a memory, the memory includes instructions that, when executed by the processor, cause the processor to perform operations comprising:
   providing a client device with a network access service comprising access to one or more networks;
   monitoring the plurality of network communications sent by the client device to a server over the network access service, each network communication being a multiplexed transport connection that supports a plurality of concurrent logical streams;
   extracting a priority indicator from one or more of the plurality of network communications, the priority indicator corresponding to a relative priority assigned by the client device to one or more logical streams of the multiplexed transport connection;
   extracting a stream quantity indicator from the one or more of the plurality of network communications, the stream quantity indicator corresponding to a number of logical streams initiated by the client device for the multiplexed transport connection;

mapping the multiplexed transport connection to a connection profile of a plurality of connection profiles based on one or more connection attributes of the multiplexed transport connection, each connection profile defining a benchmark, the benchmark comprising a priority standard and a stream quantity standard, wherein the connection profile is trained over a temporal interval;

identifying a deviation of the multiplexed transport connection from the benchmark by applying the priority indicator and the stream quantity indicator to the benchmark, wherein the priority indicator is compared to the priority standard and the stream quantity indicator is compared to the stream quantity standard; and altering the network access service of the client device based on the identifying of the deviation of the multiplexed transport connection, wherein the altering comprises at least one of redirecting the one or more of the plurality of network communications of the client device, and blocking the one or more of the plurality of network communications of the client device.

2. The computer-implemented system of claim 1, wherein the operations further comprise:

identifying the one or more of the plurality of network communications of the client device based on the one or more of the plurality of network communications corresponding to the one or more connection attributes;

generating the benchmark defined by the connection profile from the one or more of the plurality of network communications using a machine learning algorithm that comprises the one or more connection attributes as a predictor, wherein the identifying of the deviation is based on a prediction from the machine learning algorithm.

3. The computer-implemented system of claim 1, further comprising sending a message to the client device over the network access service based at least on the altering.

4. The computer-implemented system of claim 1, wherein the altering of the network access service of the client device is further based on a duration of the deviation.

5. The computer-implemented system of claim 1, wherein the one or more connection attributes comprise an operating system of the client device and an application type of the client device.

6. A computer-implemented method for detecting aberrant network communications in one or more network communications, the method comprising:

providing a client with a network access service comprising access to one or more networks;

monitoring the one or more network communications sent by the client to a server over a network access service, each network communication being a multiplexed transport connection that supports a plurality of concurrent logical streams;

mapping the multiplexed transport connection, that comprises the plurality of concurrent logical streams between the client and the server, to a connection profile that defines a benchmark based on priority indicators and stream quantity indicators, the benchmark comprising a priority standard and a stream quantity standard, wherein the connection profile is trained over a temporal interval;

identifying, a deviation of the multiplexed transport connection from the benchmark based on comparing a priority indicator and a stream quantity indicator to the benchmark, the priority indicator being a relative priority assigned by the client to the plurality of logical streams for the multiplexed transport connection and the stream quantity indicator being a number of the plurality of logical streams initiated by the client for the multiplexed transport connection, wherein the priority indicator is compared to the priority standard and the stream quantity indicator is compared to the stream quantity standard; and altering the network access service of the client based on the identifying of the deviation of the multiplexed transport connection, wherein the altering comprises at least one of redirecting the one or more network communications of the client, and blocking the one or more network communications of the client.

7. The computer-implemented method of claim 6, wherein the plurality of concurrent logical streams comprises multiplexed Hypertext Transfer Protocol (HTTP) requests.

8. The computer-implemented method of claim 6, wherein the multiplexed transport connection is a transmission control protocol (TCP) connection.

9. The computer-implemented method of claim 6, further comprising:

identifying the one or more network communications of client based on the one or more network communications corresponding to one or more connection attributes;

generating the benchmark defined by the connection profile from the one or more network communications using a machine learning algorithm that comprises the one or more connection attributes as a predictor, wherein the identifying of the deviation is based on a prediction from the machine learning algorithm.

10. The computer-implemented method of claim 6, wherein the mapping the multiplexed transport connection to the connection profile is based on one or more connection attributes of the multiplexed transport connection and the connection profile is of a plurality of connection profiles, each connection profile corresponding to a respective set of connection attributes.

11. The computer-implemented method of claim 6, wherein the altering of the network access service further comprises sending a message to the client device associated with the client over the network access service.

12. The computer-implemented method of claim 6, wherein the multiplexed transport connection is encrypted.

13. The computer-implemented method of claim 6, wherein the relative priority is represented as a value in the one or more network communications.

14. The computer-implemented method of claim 6, wherein the altering of the network access service of the client is further based on a duration of the deviation.

15. The computer-implemented method of claim 6, wherein the mapping is based on one or more connection attributes of the multiplexed transport connection that comprise an operating system of the client and an application type of the client.

16. The computer-implemented method of claim 6, further comprising:

identifying the one or more network communications that correspond to one or more connection attributes, each network communication being between the client and the server.

17. One or more non-transitory computer-storage media storing computer-useable instructions that, when executed by a computing device, perform a method for detecting aberrant network communications in one or more network communications, the method comprising:
  providing a client with a network access service comprising access to one or more networks;
  identifying the one or more network communications that correspond to one or more connection attributes, the one or more network communications being multiplexed transport connections comprising a plurality of concurrent logical streams between clients and servers;
  generating a benchmark for a connection profile based on priority indicators and stream quantity indicators extracted from the one or more network communications, the benchmark comprising a priority standard and a stream quantity standard;
  identifying, a deviation of at least one multiplexed transport connection, that comprises the plurality of concurrent logical streams between a client and a server from the benchmark based on comparing a priority indicator and a stream quantity indicator to the benchmark, the priority indicator being a relative priority assigned by the client to one or more logical streams for the multiplexed transport connection and the stream quantity indicator being a number of logical streams initiated by the client for the multiplexed transport connection by mapping the multiplexed transport connection to the connection profile, wherein the priority indicator is compared to the priority standard and the stream quantity indicator is compared to the stream quantity standard; and
  altering a network access service of the client based on the identifying of the deviation of the multiplexed transport connection, wherein the altering comprises at least one of redirecting the one or more network communications of the client, and blocking the one or more network communications of the client.

18. The one or more computer-storage media of claim 17, wherein the connection profile is used in the identifying based on determining that the one or more connection attributes correspond to the multiplexed transport connection.

19. The one or more computer-storage media of claim 17, wherein the altering of the network access service of the client is further based on a duration of the deviation.

20. The one or more computer-storage media of claim 17, wherein the one or more connection attributes comprise an operating system of one of the clients and an application type of the one of the clients.

* * * * *